UNITED STATES PATENT OFFICE.

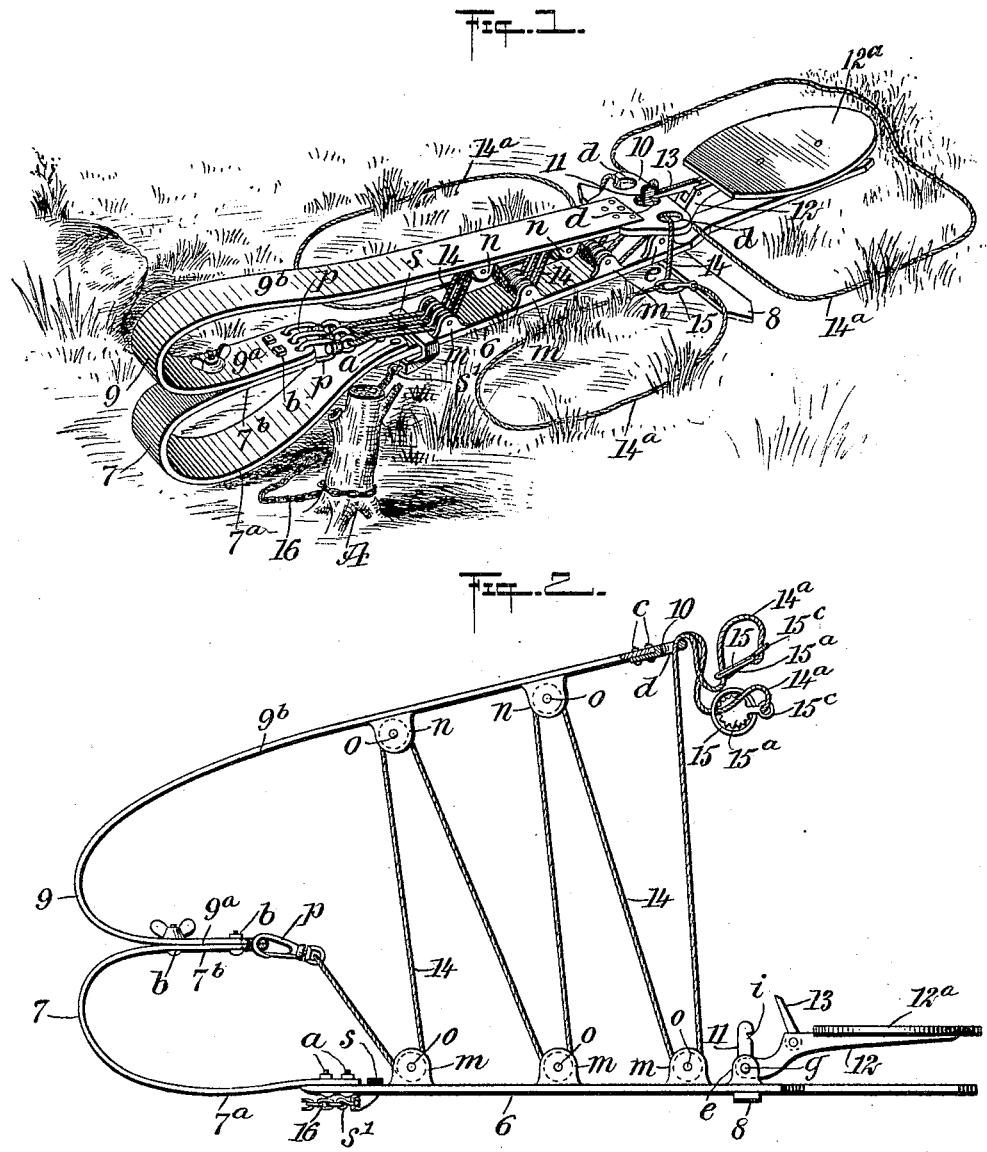

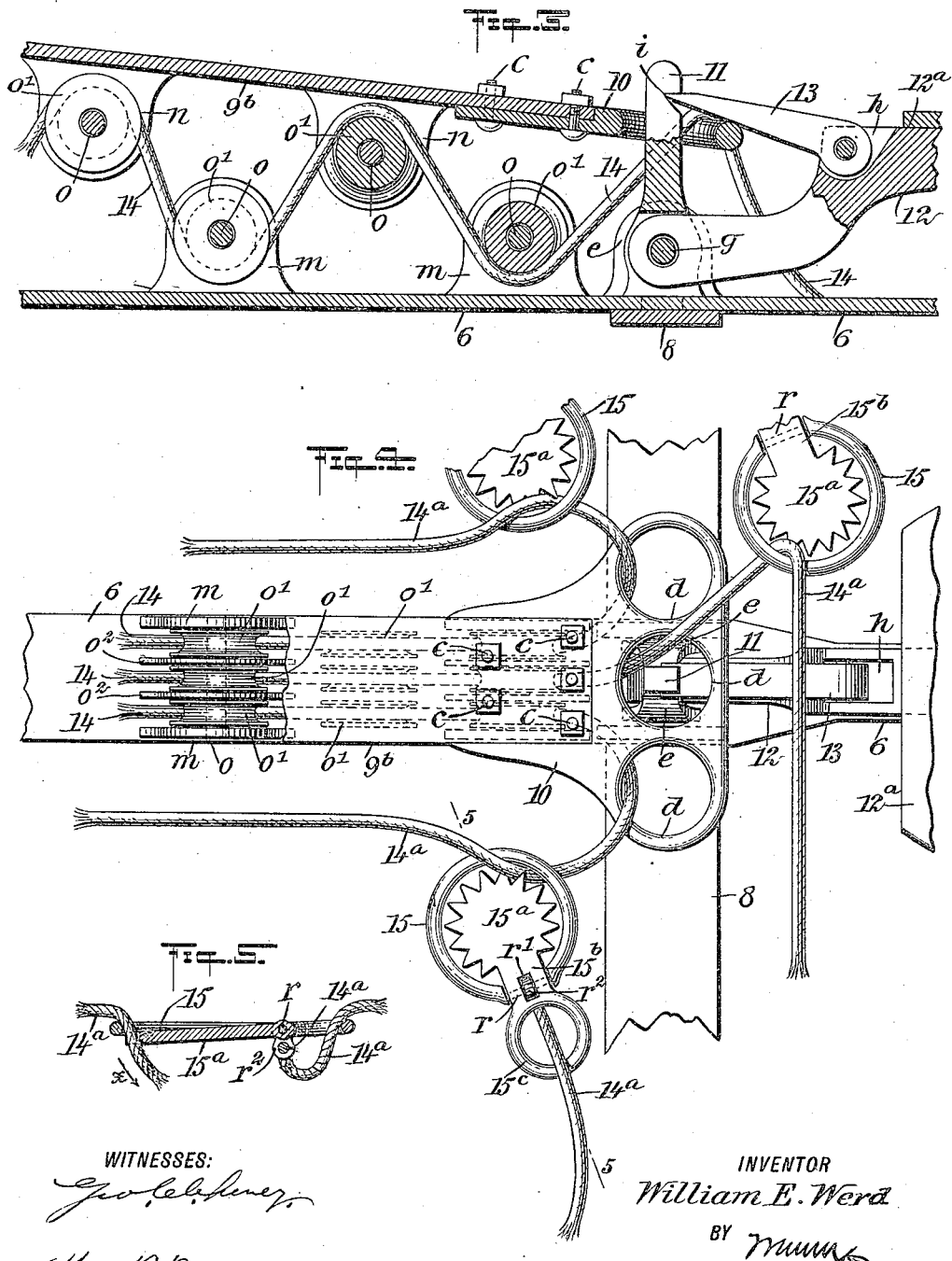

WILLIAM ELIAS WERD, OF DEER LODGE, MONTANA, ASSIGNOR OF ONE-HALF TO GRANT WILSON, OF DEER LODGE, MONTANA.

TRAP.

No. 817,601.  Specification of Letters Patent.  Patented April 10, 1906.

Application filed July 6, 1905. Serial No. 268,359.

*To all whom it may concern:*

Be it known that I, WILLIAM ELIAS WERD, a citizen of the United States, and a resident of Deer Lodge, in the county of Powell and State of Montana, have invented a new and Improved Trap, of which the following is a full, clear, and exact description.

This invention relates to a class of traps adapted for capturing animals or birds alive and without injury thereto, and has for its object to provide novel details of construction for a trap of the character indicated which are simple, strong, and very effective in service, enabling the convenient and safe setting of the trap, its easy and rapid release from a captive held therein, which avoids liability of maiming the animal or bird caught in the trap, and which enables a person who may be accidentally caught in the trap to easily release himself without suffering injury to the member held therein.

The invention consists in the novel construction and combination of parts, as is hereinafter described, and defined in the subjoined claims.

Reference is to be had to the accompanying drawings, forming a part of this specification, in which similar characters of reference indicate corresponding parts in all the figures.

Figure 1 is a perspective view of the trap set for service. Fig. 2 is a partly-sectional side view of the same, showing the trap sprung. Fig. 3 is an enlarged sectional side view of the trap in part, showing the same in a "set" condition. Fig. 4 is a plan view of details shown in Fig. 1 and that have a similar adjustment; and Fig. 5 is a transverse sectional view of a novel clamping device employed, taken substantially on the line 5 5 in Fig. 4.

The invention in brief comprises a base portion, a powerful elliptical plate-spring, secured by one end on an end of the base portion and extended above it, a suitable number of lasso-snares adapted for clasping one or more limbs of an animal, means for preventing a release of said snares by efforts of the animal, means for holding the spring member compressed, means for actuating the opened lasso-snares for their closure by their engagement with the spring member when it is released from compression, and means for releasing the compressed spring member when an animal steps on the releasing means or otherwise touches it.

The base portion of the trap is preferably constructed of three pieces of plate metal, (represented by the numerals 6, 7, and 8, respectively.)

The part 6 is in the form of a flat slab of iron or steel, having a suitable width and length for effective service. The base-section 7 is essentially U-shaped and is of resilient steel or similar metal, joined to the portion 6 and having a width equal to that of said portion 6. One member $7^a$ of the base-section may have somewhat greater length than the other, and said member $7^a$ is lapped at its end upon the normally rear end portion of the base portion 6, whereon it is secured by bolts $a$ or other means, and it will be seen that this disposal of the base-section 7 serves to project a spaced member $7^b$ thereof forwardly above the member $7^a$. At a suitable distance from the front end of the base portion 6 the remaining base-section 8 is secured transversely thereto, thus increasing the width of the base, so that it may be prevented from rocking sidewise when the completed trap is set for service.

A spring-bar 9 is an essential detail of the trap, consisting of a flat plate of steel proportioned in thickness to conform with the size and capacity of the trap and preferably having a width equal to that of the base-section 7.

The spring-bar 9 is bent to give it U shape at a suitable distance from the rear end thereof, this bend affording a spring member $9^a$, that is about equal in length with the base member $7^b$, and, as is shown in Figs. 1 and 2, the spring member $9^a$ is seated upon the base member $7^b$ and is thereto secured by bolts or rivets, as shown at $b$. The remaining member $9^b$ of the spring-bar projects forwardly above the base portion 6 and inclines upwardly toward its forward end when uncompressed, as appears in Fig. 2. An eye-hole-plate 10 is secured upon the forward end of the spring-bar member $9^b$. Said plate, which may be of cast metal, has greater thickness than the spring-bar member $9^b$ and is formed with a rectangular recess in its upper surface, wherein the end portion of said member is embedded and held by bolts $c$ or other means.

The plate 10 is widened forwardly of the recess therein and is formed with three spaced circular openings $d$, the edges of which are rounded, as indicated in Figs. 3 and 4, and it will be seen that the combined length of the spring-bar member $9^b$ and eyehole-plate 10 disposes the eyeholes or circular openings $d$ above and near to the transverse base member 8 when the spring-bar by pressure thereon is made to approach said base member.

On the base portion 6, preferably above the transverse base member 8, a post 11 is erected and secured at the transverse center of said base portion, and upon the latter, near the side edges thereof, two upright flanges $e$ $e$ are secured. An opening is formed centrally in the lower portion of the post 11 parallel with the flanges $e$, and in said opening one end of a tripping-lever 12 is pivoted, as indicated at $g$ in Figs. 2 and 3. The tripping-lever 12 extends forwardly, and upon its upper edge a tripping-plate $12^a$ is mounted and secured at a proper distance from the pivot $g$, secured in the flanges $e$ $e$. The post 11 is so positioned that it will pass loosely upward through the central circular opening $d$ in the eyehole-plate 10 when said plate and the spring-bar member $9^b$ are depressed, as represented in Figs. 1, 3, and 4.

The portion of the tripping-lever 12 that extends rearward from that portion upon which the plate $12^a$ is secured is curved downward and then away from said plate, thus affording space above the lever near the post 11 for a free downward movement of the eyehole-plate 10. Directly rearward of the tripping-plate $12^a$ a slot $h$ is formed in an angular corner of the lever 12, and in said slot a pawl 13 is pivoted at one end thereof. In the forward edge of the post 11 a transverse angular notch $i$ is formed, wherein the free end of the pawl 13 may be inserted and held for release, as will hereinafter be fully described.

Upon the base portion 6 three pairs of bracket-flanges $m$ are mounted at proper distances apart, the two flanges comprising each pair being preferably positioned at the side edges of the base portion and opposite each other. As shown in Figs. 1 and 2, the bracket-flanges $m$ are located on the basepiece 6, so that one pair is near the rear end of said base-piece, another pair is near the post 11, and the remaining pair centrally between the front and rear pairs.

Upon the lower surface of the elongated member $9^b$ of the spring-bar 9 two pairs of bracket-flanges $n$ are secured, each pair being positioned individually opposite each other at the side edges of the spring-bar. The relative location of the bracket-flanges $n$ is such that each pair thereof will be disposed between two pairs of the similar flanges $m$ when the spring-bar member $9^b$ is forced downward near to the base-piece 6, as appears in Figs. 1 and 3. The bracket-flanges $m$ and $n$ are centrally perforated for reception of pivot-rods $o$, on each of which is loosely mounted a set of three similar peripherally-grooved sheave-wheels $o'$ and an intervening set of two washers $o^2$, as shown, for one set of sheaves and washers in Fig. 4, and it will be seen that correspondingly-located sheave-wheels on all the pivot-rods $o$ will be disposed in the same plane for each set thereof.

In the lapped portions of the base-section $7^b$ and lower member $9^a$ on the spring-bar 9, which are secured together, a set of three spaced perforations is formed, which each loosely receive a snap-hook $p$, that has a swivel connection with one end of a chain, wire rope, or cord, the kind and thickness of such flexible connections 14 depending upon the size of the trap and character of the game to be snared therewith.

In the drawings cords 14 are represented as flexible connections; but it is to be understood that chains or small wire ropes may be used on traps that are designed for snaring large animals or birds and that embody the details of the invention.

From the swivel-hooks $p$ the cords 14 are each extended first down to the nearest grooved wheel $o'$, below and around the lower portion of which the cord is passed, and thence are extended upward to the sheavewheel in the same vertical plane therewith that is pivoted on the rear pair of bracketflanges $n$. The flexible connection 14 is now made to alternately engage a lower sheavewheel $o'$ and then an upper one, finally passing up from the sheave-wheel nearest to the post 11 and through the opening $d$, which is directly above the engaged forward sheavewheel. There are three flexible connections 14 provided, and each one is connected to the lapped ends of the plates $7^b$ $9^a$; but a less number may be employed, if this is preferred, and each cord, rope, or chain 14 that is employed is extended to a suitable length from the eyehole $d$ which it occupies for the formation of a noose or snare $14^a$ on said extended portion.

It is a feature of the invention to provide means for the forming and control of each slip-noose $14^a$, so that while it may be drawn upon an object, such as the leg of an animal, and freely contract around the same there can be no relaxing of the constriction of the slip-noose until it has been manipulated specially to enable the enlargement of the noose.

The clasping means for the nooses $14^a$ each consists of an open ring 15 and a clamping device pivoted between the spaced ends of the ring. As shown clearly in Figs. 4 and 5, the clamping device comprises a peripherally-toothed head $15^a$, an arm $15^b$, extended from the head, and a ring $15^c$, formed integrally on the other end of said arm. A pivot-rod $r$ passes loosely through the arm 15ᵇ and at its ends is fixed in the ends of the open ring 15, that loosely embrace the sides of said arm. In the arm an opening $r'$ may be formed at the transverse center thereof, and on the portion of the pivot-rod $r$ thus exposed a short link $r^2$ is mounted, said link projecting below the arm 15ᵇ. The link $r^2$ is perforated transversely below the arm 15ᵇ, and thus adapted for an attachment of the extremity of a respective cord that is the end of a slip-noose 14ª, said end portion of the cord having first been passed up through a serration in the toothed head 15ª and thence down through the ring 15ᶜ.

A sufficient length of the cord 14 is provided as slack material for the formation of a noose 14ª, and it will be noted in Fig. 1 that the three nooses formed by the described means on the respective end portions of the cords 14 may be arranged to lie upon the ground, two at opposite sides of the base-piece 6 of the trap and one around the tripping-plate 12ª. The special construction of the similar clamping devices provided for the control of the slip-nooses 14ª will each permit the cord forming a noose to be drawn freely for a closure of the noose, as the pull in this case is in the direction of the arrow $x$ in Fig. 5. It will be seen, however, that when the closing of a noose 14ª around an object, such as the leg of an animal, causes a clasping constriction of the noose thereon any effort made by the animal will cause draft strain on the cord forming the running member of the noose in a direction opposite that indicated by the arrow $x$, which will obviously serve to tighten the noose on the object it encircles.

A shackle-chain 16 is employed for securing the trap to a tree-body or stump A, as shown in Fig. 1, a flat ring S, loosely mounted upon the base portion 6, near the lapped end of the bowed base member 6ª, having a depending ear thereon, which is perforated for the loose engagement of a swivel eyebolt S' therewith, the chain (shown broken away in Fig. 2) being afforded sufficient length for a secured engagement with the stump or tree-body A, any suitable means for its attachment thereto being employed.

In setting the trap it is placed on level ground and the spring-bar member 9ᵇ is forcibly depressed, so that the post 11 passes up through the central opening $d$ in the eyehole-plate 10 and sufficiently above it to permit the pawl 13 to be entered at its free end in the notch $i$, thus detachably securing the pawl upon the post above the engaged end portion of the plate 10 on the spring-bar 9. The slip-nooses 14ª are now enlarged sufficiently and then laid flat on the ground near the trap, as hereinbefore explained, and the trap, as well as the nooses, may be lightly covered with loose grass or straw for concealment of the same.

It will be seen that as the animal to be caught may without suspicion tramp around the trap contact of the nose or foot of the animal with the tripping-plate 12ª may result. The imposed weight will depress the plate 12ª and outer end of the lever 12, thus drawing the toe of the pawl 13 out of the notch $i$ and suddenly releasing the compressed spring-bar member 9ᵇ, whereupon the resultant violent upward pull of the cords 14 will instantly contract one or more of the slip-nooses 14ª around the leg or legs of the animal that may have been placed within the opened noose or nooses, and thus snare the animal. As before explained, the improved means for holding the noose clasped around a limb of an animal will prevent the release of the captive, and its efforts to effect its release will only serve to bind and hold it in a tighter-drawn snare.

Obviously the range of use for the trap is extensive, as wild animals of different species and sizes may be captured alive and uninjured by means of the improvement, the dimensions of the trap being proportioned to suit that of the game to be taken.

To prevent a gnawing release of an animal, the flexible connections 14 may be of wire, wire rope, or chains of suitable weight; but in snaring birds when small traps are employed the flexible connections may be of strong cordage.

Having thus described my invention, I claim as new and desire to secure by Letters Patent—

1. A trap, embodying a base-plate having a bowed end portion, a flat spring-bar having a similarly-bowed end portion seated and secured upon the bowed portion of the base-plate, a latching device on the base-plate adapted for holding the spring-bar depressed and releasable by pressure, and a flexible connection secured by one end on the trap and having a slip-noose at the opposite end.

2. A trap, embodying a base formed of a flat metal bar, a cross-piece near one end thereof and a U-shaped bowed portion at the opposite end of said flat base-piece, a flat spring-bar having a similarly-bowed end portion seated and secured upon the bowed portion of the base-plate, a latching device on the base-plate adapted for holding the spring-bar depressed and releasable by pressure, and a flexible connection secured by one end on the trap and having a slip-noose at the opposite end.

3. A trap, embodying a base formed of a flat metal bar, a cross-piece near one end thereof and a U-shaped bowed portion at the opposite end of said flat base-piece, a flat-bodied spring-bar having a similarly-bowed end portion seated and secured upon the bowed portion of the base-plate, a latching device on the base-plate near its front end, adapted for holding the spring-bar depressed and releasable by pressure, a plurality of flexible connections all secured by one end of each upon the rear end of the base-plate, means for loosely supporting the flexible connections on the trap as they extend toward the forward end thereof, and a slip-noose on the forward end of each flexible connection.

4. A trap, embodying a base formed of a flat metal bar, a cross-piece near one end thereof and a U-shaped bowed portion at the opposite end of the flat base-piece, a flat-bodied spring-bar having a similarly-bowed end portion that is seated and secured upon the bowed portion of the base-plate, a latching device embodying a post on the base-plate passing through an opening in the front end of the spring-bar when said bar is depressed, a tripping-lever having a foot-plate thereon and pivoted on the post, and a pawl pivoted upon the tripping-lever and engaging a notch in the post when said post is passed through the opening in the depressed spring-bar, a plurality or rotatably-supported sheave-wheels mounted on the base-plate and spring-bar of the trap, the flexible connections extending forwardly over the sheave-wheels, and a slip-noose on the forward end of each flexible connection.

5. In a device of the character described, a plurality of flexible connections each having a slip-noose on one end, and clamping means for each slip-noose for preventing its release, said means consisting of an open ring, a circular head having a serrated edge, and a lateral arm on the ring having an opening at its outer end, said arm being pivoted between the ends of the open ring.

In testimony whereof I have signed my name to this specification in the presence of two subscribing witnesses.

WILLIAM ELIAS WERD.

Witnesses:
W. F. JOHNSON,
T. H. MASON.